(12) United States Patent
Nishisaka et al.

(10) Patent No.: US 9,224,543 B2
(45) Date of Patent: Dec. 29, 2015

(54) CERAMIC ELECTRONIC COMPONENT INCLUDING GLASS COATING LAYER

(71) Applicant: Murata Manufacturing Co., Ltd., Nagaokakyo-shi, Kyoto-fu (JP)

(72) Inventors: Yasuhiro Nishisaka, Nagaokakyo (JP); Yukio Sanada, Nagaokakyo (JP); Tetsuya Kisumi, Nagaokakyo (JP); Akira Ishizuka, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 122 days.

(21) Appl. No.: 13/755,224

(22) Filed: Jan. 31, 2013

(65) Prior Publication Data
US 2013/0201600 A1 Aug. 8, 2013

(30) Foreign Application Priority Data

Feb. 3, 2012 (JP) ................................. 2012-022322
Dec. 27, 2012 (JP) ................................. 2012-284452

(51) Int. Cl.
*H01G 4/005* (2006.01)
*H01G 4/232* (2006.01)
*H01G 4/30* (2006.01)
*H01G 13/00* (2013.01)

(52) U.S. Cl.
CPC ............. *H01G 13/006* (2013.01); *H01G 4/005* (2013.01); *H01G 4/2325* (2013.01); *H01G 4/30* (2013.01)

(58) Field of Classification Search
CPC ........ H01G 4/2325; H01G 4/232; H01G 4/30
USPC ............................................ 361/306.3, 321.2
See application file for complete search history.

(56) References Cited

U.S. PATENT DOCUMENTS 3,809,973 A * 5/1974 Hurley .......................... 361/305
4,082,906 A * 4/1978 Amin et al. .................... 361/320
4,353,153 A * 10/1982 Prakash ........................ 29/25.42

(Continued)

FOREIGN PATENT DOCUMENTS

EP 183399 A2 * 6/1986
EP 777242 A2 * 6/1997

(Continued)

OTHER PUBLICATIONS

Nishisaka et al, "Ceramic Electronic Component", U.S. Appl. No. 13/755,197, filed Jan. 31, 2013.

(Continued)

*Primary Examiner* — David M Sinclair
(74) *Attorney, Agent, or Firm* — Keating & Bennett, LLP (57) ABSTRACT

A ceramic electronic component includes a ceramic body, a plurality of internal electrodes provided in the ceramic body and including ends exposed on a surface of the ceramic body; a glass coating layer covering a portion of the surface of the ceramic body on which the internal electrodes are exposed; and an electrode terminal provided directly on the glass coating layer and including a plating film. The glass coating layer is made of a glass medium in which metal powder particles are dispersed. The internal electrodes project from the surface of the ceramic body into the glass coating layer without passing through the glass coating layer. The metal powder particles define conduction paths electrically connecting the internal electrodes with the electrode terminal.

19 Claims, 9 Drawing Sheets

(56) References Cited

U.S. PATENT DOCUMENTS

| | | | | |
|---|---|---|---|---|
| 4,517,155 | A | * | 5/1985 | Prakash et al. .................. 419/19 |
| 4,913,932 | A | * | 4/1990 | Moser et al. .................. 427/123 |
| 5,312,581 | A | * | 5/1994 | Amano et al. .................... 419/8 |
| 5,712,758 | A | * | 1/1998 | Amano et al. ............. 361/321.2 |
| 5,818,686 | A | | 10/1998 | Mizuno et al. |
| 6,958,899 | B2 | * | 10/2005 | Togashi et al. ................ 361/303 |
| 8,248,752 | B2 | * | 8/2012 | Hur et al. ...................... 361/311 |
| 2003/0231457 | A1 | | 12/2003 | Ritter et al. |
| 2004/0022009 | A1 | | 2/2004 | Galvagni et al. |
| 2004/0090732 | A1 | | 5/2004 | Ritter et al. |
| 2004/0197973 | A1 | | 10/2004 | Ritter et al. |
| 2004/0218344 | A1 | | 11/2004 | Ritter et al. |
| 2004/0218373 | A1 | | 11/2004 | Ritter et al. |
| 2004/0257748 | A1 | | 12/2004 | Ritter et al. |
| 2004/0264105 | A1 | | 12/2004 | Galvagni et al. |
| 2005/0046536 | A1 | | 3/2005 | Ritter et al. |
| 2005/0146837 | A1 | | 7/2005 | Ritter et al. |
| 2007/0014075 | A1 | | 1/2007 | Ritter et al. |
| 2007/0133147 | A1 | | 6/2007 | Ritter et al. |
| 2011/0290542 | A1 | * | 12/2011 | Nishisaka et al. ............ 174/257 |

FOREIGN PATENT DOCUMENTS

| | | | | |
|---|---|---|---|---|
| JP | 04023308 | A | * | 1/1992 |
| JP | 08-097075 | A | | 4/1996 |
| JP | 9-7877 | A | | 1/1997 |
| JP | 09-102854 | A | | 4/1997 |
| JP | 9-283365 | A | | 10/1997 |
| JP | 10-050550 | A | | 2/1998 |
| JP | 11243029 | A | * | 9/1999 |
| JP | 2002-203737 | A | | 7/2002 |
| JP | 2004-327983 | A | | 11/2004 |
| JP | 2007036003 | A | * | 2/2007 |
| JP | 2011-49351 | A | | 3/2011 |
| WO | 2004/093137 | A2 | | 10/2004 |

OTHER PUBLICATIONS

Nishisaka et al, "Ceramic Electronic Component and Method for Producing the Same", U.S. Appl. No. 13/755,232, filed Jan. 31, 2013.

* cited by examiner

CERAMIC ELECTRONIC COMPONENT INCLUDING GLASS COATING LAYER

BACKGROUND OF THE INVENTION

1. Field of the Invention

The present invention relates to ceramic electronic components.

2. Description of the Related Art

Ceramic electronic components, typified by ceramic capacitors, are widely used in electronic devices, such as a cellular phone or a portable audio player. A ceramic electronic component generally includes a ceramic body; internal electrodes whose ends are exposed on the surface of the ceramic body; and external electrodes disposed to cover the surface regions of the ceramic body on which the internal electrodes are exposed. Examples of the external electrode include one obtained by applying and baking an electrically conductive paste to the ceramic body to form a sintered metal film and then plating the sintered metal film, as described in JP-A-2002-203737, and one formed only of a plating film, as described in JP-A-2004-327983.

However, because the electrically conductive paste used in forming the sintered metal film has high viscosity, the thickness of the resultant sintered metal film becomes large. For example, JP-A-2002-203737 states that the thickness of first and second electrode layers (sintered metal films) reaches approximately 50 µm to 90 µm.

Furthermore, if the external electrode is formed of a sintered metal film, the baking temperature at which the electrically conductive paste is baked reaches a high temperature. Therefore, a ceramic component in the ceramic body and a glass component in the electrically conductive paste may diffuse into each other to form a reaction layer at the interface between the ceramic body and the sintered metal film. In this case, a plating solution may enter the ceramic body through the site where the reaction layer is formed, which may cause a problem of a decrease in mechanical strength of the ceramic body and a problem of deterioration in reliability of moisture resistance thereof. In addition, the high baking temperature causes the precipitation of the glass component on the surface of the sintered metal film, i.e., glass floating, which presents another problem of difficulty in forming a plating film on the surface of the sintered metal film.

To cope with this, a method of making an external electrode only of a plating film is proposed as in JP-A-2004-327983. When an external electrode is made only of a plating film, the external electrode can be formed thinner than that formed by baking an electrically conductive paste, for example.

In addition, because the plating solution contains no glass component, no reaction layer is formed at the interface between the ceramic body and the plating film. Therefore, problems of a decrease in mechanical strength and deterioration in reliability of moisture resistance due to the formation of the reaction layer are less likely to occur. No glass floating occurs, so that the problem of difficulty in forming a plating film can be eliminated.

However, in order to form the external electrode only of a plating film, it is necessary to immerse the ceramic body directly into a plating solution. This presents a problem of entrance of the plating solution into the ceramic body through exposed portions of the internal electrodes. Thus, the resultant ceramic electronic component may decrease the moisture resistance.

Furthermore, when the external electrode is formed only of a plating film, the plating film is not only chemically but physically bound to the ceramic body, so that the adhesion between the plating film and the ceramic body will be poor. As a result, when the ceramic electronic component is in use, moisture or the like is likely to enter the ceramic body from between the plating film and the ceramic body. Also in this view, the resultant ceramic electronic component may decrease the moisture resistance.

SUMMARY OF THE INVENTION

Preferred embodiments of the present invention provide a ceramic electronic component having superior moisture resistance while maintaining a small thickness of the external electrode.

A ceramic electronic component according to a preferred embodiment of the present invention includes a ceramic body, a plurality of internal electrodes, a glass coating layer, and an electrode terminal. The plurality of internal electrodes are provided in the ceramic body and include ends exposed on a surface of the ceramic body. The glass coating layer covers a portion of the surface of the ceramic body on which the plurality of internal electrodes are exposed. The electrode terminal is provided directly on the glass coating layer. The electrode terminal includes a plating film. The glass coating layer is made of a glass medium in which metal powder particles are dispersed. The plurality of internal electrodes project from the surface of the ceramic body into the glass coating layer without passing through the glass coating layer. The metal powder particles define conduction paths electrically connecting the plurality of internal electrodes with the electrode terminal.

In a particular aspect of the ceramic electronic component according to a preferred embodiment of the present invention, portions of the internal electrodes projecting from the surface of the ceramic body preferably have a length of about 50% or less than a thickness of the glass coating layer.

In another particular aspect of the ceramic electronic component according to a preferred embodiment of the present invention, the portions of the internal electrodes projecting from the surface of the ceramic body preferably have a length of about 34% or less than the thickness of the glass coating layer.

In still another particular aspect of the ceramic electronic component according to a preferred embodiment of the present invention, at least one of the conduction paths is preferably arranged so that a plurality of the metal powder particles are contiguous with one another across the thickness of the glass coating layer.

In still another particular aspect of the ceramic electronic component according to a preferred embodiment of the present invention, the metal powder particles preferably contain a major component different from a metal contained as a major component in the internal electrodes.

In still another particular aspect of the ceramic electronic component according to a preferred embodiment of the present invention, the metal powder particles preferably include a core made of Cu.

In still another particular aspect of the ceramic electronic component according to a preferred embodiment of the present invention, the glass coating layer preferably has a thickness of about 1 µm to about 10 µm.

In still another particular aspect of the ceramic electronic component according to a preferred embodiment of the present invention, at least one of the conduction paths preferably is non-linear as viewed in cross section along the thickness direction of the glass coating layer.

In still another particular aspect of the ceramic electronic component according to a preferred embodiment of the present invention, at least one of the conduction paths preferably includes a plurality of relatively narrow portions and a plurality of relatively thick portions.

In still another particular aspect of the ceramic electronic component according to a preferred embodiment of the present invention, a portion of the plating film in contact with the glass coating layer preferably includes a Cu plating film or a Ni plating film.

In still another particular aspect of the ceramic electronic component according to a preferred embodiment of the present invention, the amount of glass in the glass coating layer preferably is about 35% by volume or more.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Hereinafter, preferred embodiments of the present invention will be described. However, the following preferred embodiments are merely illustrative. The present invention is not intended to be limited to the following preferred embodiments.

Throughout the drawings to which the preferred embodiments and the like refer, elements having substantially the same functions will be referred to by the same reference signs. The drawings to which the preferred embodiments and the like refer are schematically illustrated and, therefore, the dimensional ratios and the like of elements illustrated in the drawings may be different from those of the actual elements. Different drawings may have different dimensional ratios and the like of the elements. Dimensional ratios and the like of specific objects should be determined in consideration of the following descriptions.

Figure 1:
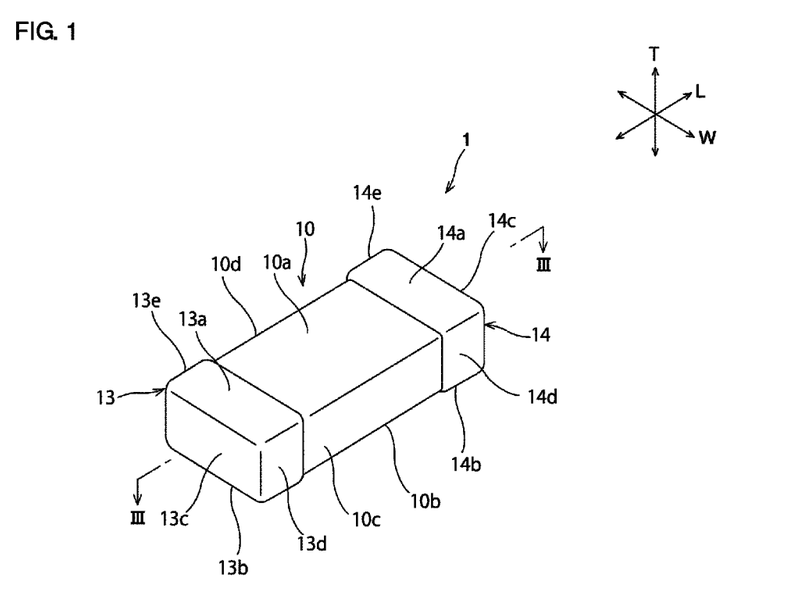
FIG. 1 is a schematic perspective view of a ceramic electronic component according to a first preferred embodiment of the present invention.
Figure 2:
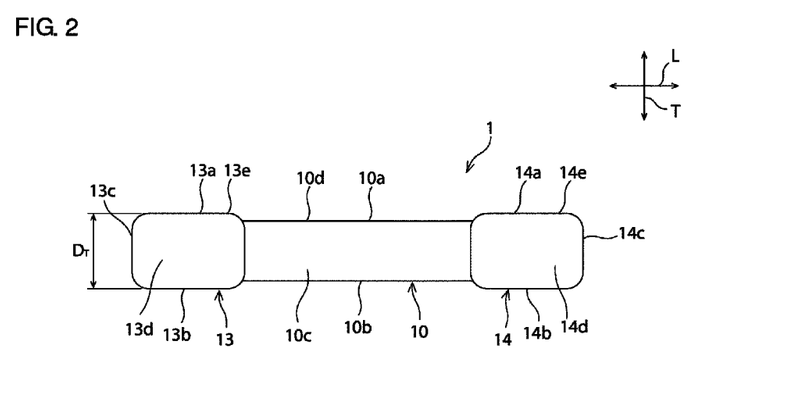
FIG. 2 is a schematic side view of the ceramic electronic component according to the first preferred embodiment of the present invention.
Figure 3:
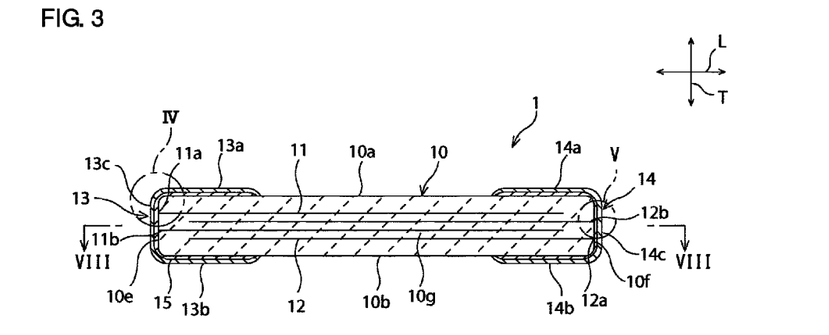
FIG. 3 is a schematic cross-sectional view taken along the line III-III in FIG. 1.
Figure 4:
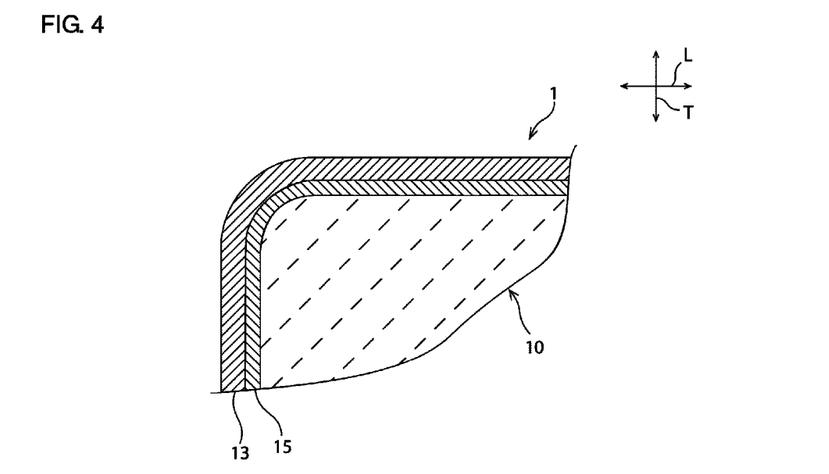
FIG. 4 is a schematic enlarged cross-sectional view of a portion enclosed by the line IV in FIG. 3.
Figure 5:
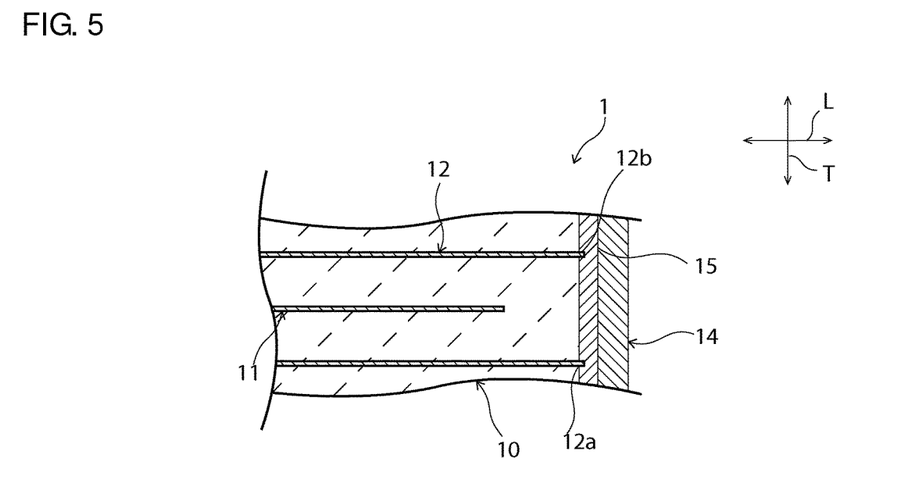
FIG. 5 is a schematic enlarged cross-sectional view of a portion enclosed by the line V in FIG. 3.
Figure 6:
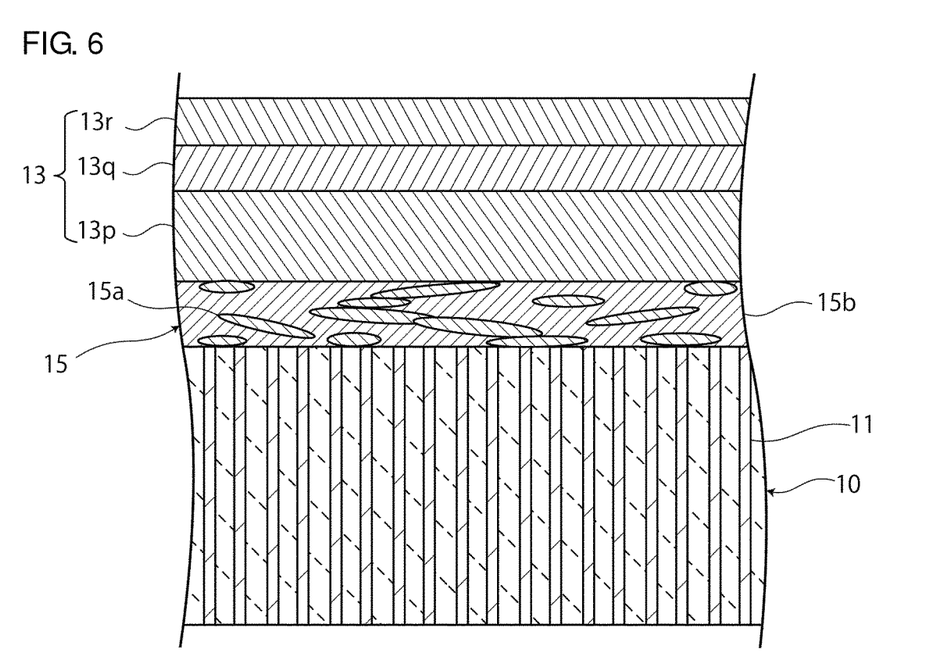
FIG. 6 is a schematic cross-sectional view of a glass coating layer and a first electrode terminal of the ceramic electronic component produced in the first preferred embodiment of the present invention.
Figure 7:
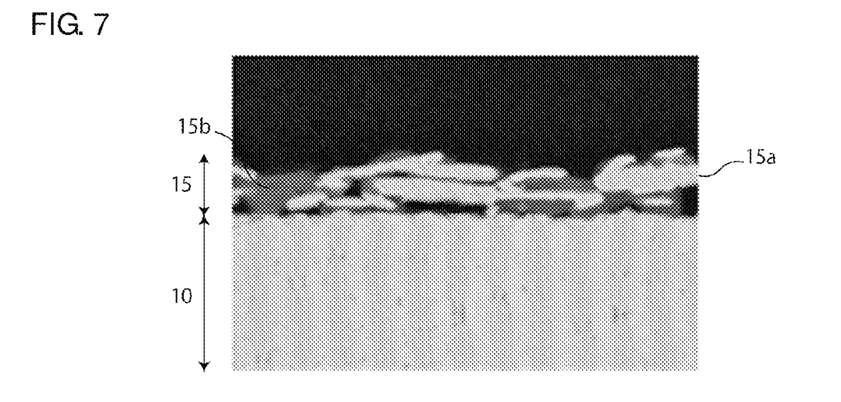
FIG. 7 is a scanning electron microscopic photograph of a cross section of the glass coating layer in an end surface of the ceramic electronic component produced in the first preferred embodiment of the present invention.
Figure 8:
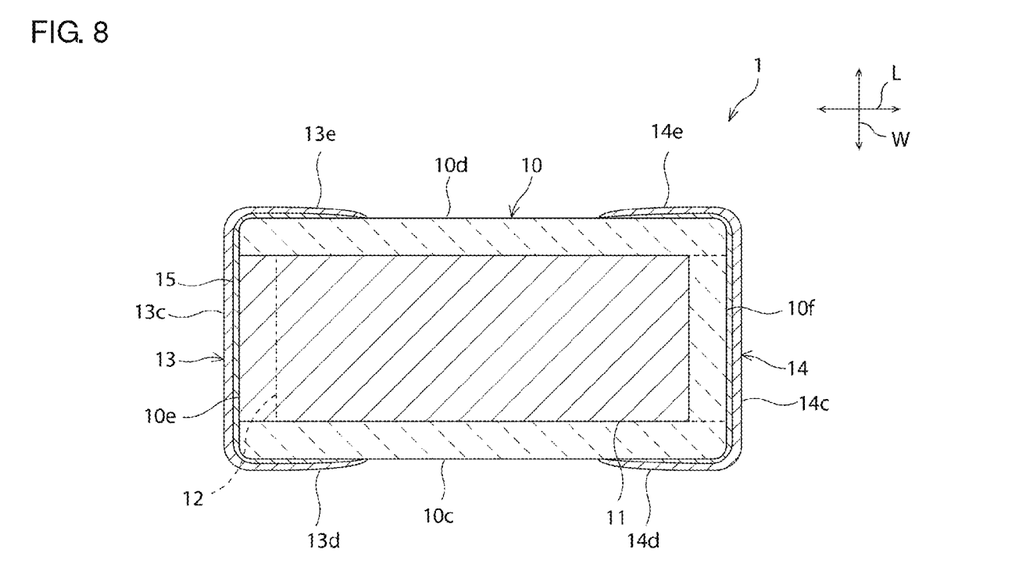
FIG. 8 is a schematic cross-sectional view taken along the line VIII-VIII in FIG. 3.

FIG. 1 is a schematic perspective view of a ceramic electronic component according to the first preferred embodiment of the present invention. FIG. 2 is a schematic side view of the ceramic electronic component according to this preferred embodiment. FIG. 3 is a schematic cross-sectional view taken along the line III-III in FIG. 1. FIG. 4 is a schematic enlarged cross-sectional view of a portion enclosed by the line IV in FIG. 3. FIG. 5 is a schematic enlarged cross-sectional view of a portion enclosed by the line V in FIG. 3. FIG. 6 is a schematic cross-sectional view of a glass coating layer and a first electrode terminal of the ceramic electronic component produced in this preferred embodiment. FIG. 7 is a scanning electron microscopic (SEM) photograph of a cross section of the interface between the glass coating layer and a first electrode terminal of the ceramic electronic component produced in this preferred embodiment. Note that FIG. 7 is a photograph when only the glass coating layer is formed in order to facilitate understanding of the state of the glass coating layer. FIG. 8 is a schematic cross-sectional view taken along the line VIII-VIII in FIG. 3.

First, a description is given of the structure of the ceramic electronic component 1 with reference to FIGS. 1 to 8.

As shown in FIGS. 1 to 3 and 8, the ceramic electronic component 1 includes a ceramic body 10. The ceramic body 10 is made of an appropriate ceramic material according to the function of the ceramic electronic component 1. Specifically, if the ceramic electronic component 1 is a capacitor, the ceramic body 10 can be made of a dielectric ceramic material. Specific non-limiting examples of the dielectric ceramic material include $BaTiO_3$, $CaTiO_3$, $SrTiO_3$, and $CaZrO_3$. If the ceramic body 10 contains a dielectric ceramic material, in addition to the above ceramic material as a major component, an accessory component or components, such as a Mn compound, a Mg compound, a Si compound, a Fe compound, a Cr compound, a Co compound, a Ni compound, or a rare earth compound, may be appropriately added to the ceramic body 10 depending upon desired properties of the resultant ceramic electronic component 1.

No particular limitation is placed on the shape of the ceramic body 10. In this preferred embodiment, the ceramic body 10 preferably has a rectangular box shape, for example. As shown in FIGS. 1 to 3, the ceramic body 10 includes first and second principal surfaces 10a and 10b extending along the length direction L and the width direction W. The ceramic body 10 also includes, as shown in FIGS. 1, 2, and 8, first and second side surfaces 10c and 10d extending along the thickness direction T and the length direction L. In addition, as shown in FIGS. 2, 3, and 8, the ceramic body 10 also includes first and second end surfaces 10e and 10f extending along the thickness direction T and the width direction W.

The term "rectangular box shape" used herein includes any rectangular box shape having rounded corners and ridges. In other words, the "rectangular box-shaped" member includes every member having the first and second principal surfaces, the first and second side surfaces, and the first and second end surfaces. Furthermore, all or some of the principal surfaces, side surfaces, and end surfaces may have asperities.

No particular limitation is placed on the dimensions of the ceramic body 10. However, where the thickness of the ceramic body 10 is represented by $D_T$, the length thereof is represented by $D_L$, and the width thereof is represented by $D_W$, the ceramic body 10 may preferably have a thin shape satisfying that $D_T<D_W<D_L$, $(1/5)D_W \leq D_T \leq (1/2)D_W$ or $D_T<0.3$ mm, for example. Specifically, the ceramic body 10 may preferably satisfy that 0.05 mm$\leq D_T<0.3$ mm, 0.4 mm$\leq D_L \leq 1$ mm, and 0.3$\leq$mm$\leq D_W \leq 0.5$ mm, for example.

As shown in FIGS. 3 and 8, the interior of the ceramic body 10 includes a plurality of approximately rectangular first internal electrodes 11 and a plurality of approximately rectangular second internal electrodes 12. The first and second internal electrodes 11 and 12 are alternately arranged at regular intervals in the thickness direction T. The first and second internal electrodes 11 and 12 are exposed at first ends 11a and 12a on the surface of the ceramic body 10. Specifically, the first internal electrodes 11 are exposed at the first ends 11a on the first end surface 10e of the ceramic body 10. The second internal electrodes 12 are exposed at second ends 12a on the second end surface 10f of the ceramic body 10.

The first and second internal electrodes 11 and 12 are parallel or approximately parallel with the first and second principal surfaces 10a and 10b. Each pair of adjacent first and second internal electrodes 11 and 12 face each other in the thickness direction T with a ceramic layer 10g interposed therebetween.

No particular limitation is placed on the thickness of the ceramic layer 10g. The thickness of the ceramic layer 10g may be about 0.5 μm to about 10 μm, for example. No particular limitation is also placed on the thickness of each of the first and second internal electrodes 11 and 12. The thickness of each of the first and second internal electrodes 11 and 12 may be about 0.2 μm to about 2 μm, for example.

The first and second internal electrodes 11 and 12 can be made of any appropriate electrically conductive material. For example, the first and second internal electrodes 11 and 12 can be made of a metal, such as Ni, Cu, Ag, Pd or Au, or an alloy containing one or more of these metals, such as Ag—Pd alloy.

As shown in FIG. 4, glass coating layers 15 are provided on the surface of the ceramic body 10. The glass coating layers 15 cover portions of the surface of the ceramic body 10 on which the first and second internal electrodes 11 and 12 are exposed. Specifically, the glass coating layers 15 are provided on the first and second end surfaces 10e and 10f of the ceramic body 10, both ends of each of the first and second principal surfaces 10a and 10b in the length direction L, and both ends of each of the first and second side surfaces 10c and 10d in the length direction L.

As shown in FIG. 5, the internal electrodes 11 and 12 project from the surface of the ceramic body 10 into the glass coating layer 15 without passing through the glass coating layer 15. The length of the portions (hereinafter, referred to as projections) 11b and 12b of the internal electrodes 11 and 12 projecting from the surface of the ceramic body 10 is preferably about 50% or less of the thickness of the glass coating layer 15, more preferably about 40% or less thereof, still more preferably about 35% or less thereof, and yet more preferably about 34% or less thereof, for example. The length of the projections 11b and 12b is preferably about 1.7 μm or less, for example.

An explanation of how the first and second internal electrodes 11 and 12 project from the surface of the ceramic body 10 is as follows. The metal contained in the glass coating layers 15 gathers at the distal ends of the first and second internal electrodes 11 and 12 to induce diffusion of the metal contained in the first and second internal electrodes 11 and 12 and metal powder particles 15a contained in the glass coating layers 15 and the distal ends of the first and second internal electrodes 11 and 12 become alloyed to cause crystal growth, resulting in the projection of the first and second internal electrodes 11 and 12 from the surface of the ceramic body 10.

As shown in FIGS. 6 and 7, the glass coating layer 15 is made of a glass medium 15b in which metal powder particles 15a are dispersed. The glass coating layer 15 is a composite film in which the glass medium 15b and the metal powder particles 15a are integrally bonded. The glass medium 15b is obtained by thermally treating glass powder at a softening point or higher temperature to melt it and then solidifying the molten glass into a single piece. Thus, the glass medium 15b exists to fill the spaces between the metal powder particles 15a. The glass medium 15b covers the surface portions of the ceramic body 10. This glass medium 15b improves the moisture resistance of the ceramic electronic component 1. Note that FIGS. 6 and 7 are views in certain cross sections and the other cross sections show different views of the glass medium 15b and metal powder particles 15a.

In the glass coating layers 15, the volume content of the glass medium 15b may be smaller than that of the metal powder particles 15a. The amount of the glass medium 15b in the glass coating layer 15 is preferably about 35% by volume or more, more preferably about 35% to about 75% by volume, and still more preferably about 40% to about 57.5% by volume, for example. If the amount of the glass medium 15b in the glass coating layer 15 is less than about 35% by volume, this may reduce the effect of improving the moisture resistance of the ceramic electronic component 1 owing to the existence of the glass coating layer 15. On the contrary, if the amount of the glass medium 15b in the glass coating layer 1 is more than about 75% by volume, this may make it difficult to form first and second electrode terminals 13 and 14 directly on the associated glass coating layers 15. The glass forming the glass medium 15b preferably contains, for example, one or more network formers selected from the group consisting of $B_2O_3$ and $SiO_2$ and one or more network modifiers selected from the group consisting of $Al_2O_3$, ZnO, CuO, $Li_2O$, $Na_2O$, $K_2O$, MgO, CaO, BaO, $ZrO_2$, and $TiO_2$.

The glass medium 15b preferably contains as the network modifier an oxide of the same metal as the metal powder particles 15a in the glass coating layer 15. Thus, the glass powder particles in the glass coating layer 15 are easily wet with the metal powder particles 15a in the glass coating layer 15.

The glass medium 15b preferably contains $SiO_2$ as the highest content component. The amount of $SiO_2$ in the total amount of the glass is preferably about 35% by mole or more.

In the glass coating layers 15, the metal powder particles 15a are dispersed in the glass medium 15b. The amount of the metal powder particles 15a in the glass coating layer 15 is preferably about 25% to about 65% by volume and more preferably about 50% to about 60% by volume. For example, the metal powder particles 15a are made of a metal, such as Cu, Ni Ag, Pd or Au, or an alloy containing one or more of these metals, such as Ag—Pd alloy. The metal powder particles 15a preferably do not contain as a major component the same metal as the metal contained as a major component in the first and second internal electrodes 11 and 12. In other words, the major component of the metal powder particles 15a is preferably different from that of the first and second internal electrodes 11 and 12. If the metal powder particles 15a contain the same metal as the metal contained as a major component in the first and second internal electrodes 11 and 12, the content of the metal is preferably about 10% or less of the total volume of the metal powder particles 15a. The metal powder particles 15a preferably include a core made of Cu, for example.

Figure 16:
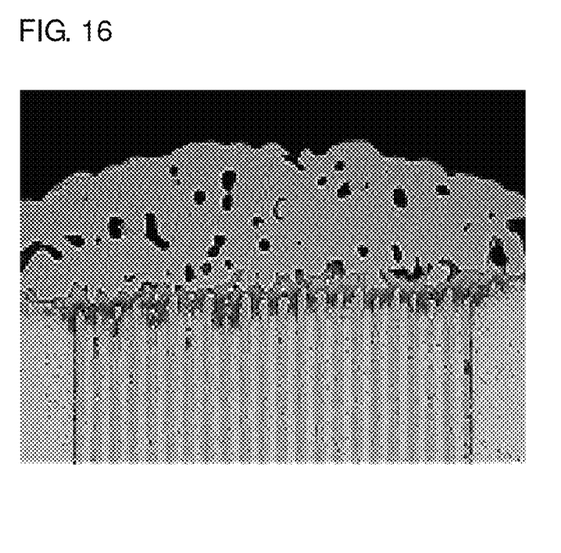
FIG. 16 is a photograph of a cross section of a sintered metal film obtained by firing an electrically conductive paste layer.

The glass coating layer 15 is different from a sintered metal film obtained by firing an electrically conductive paste layer and made of a sintered metal and a glass. Specifically, whereas the glass coating layer 15 includes the glass medium 15b continuously arranged to fill the spaces between the metal powder particles 15a, the sintered metal film includes a metal matrix formed therein. Whereas in the glass coating layer 15 all of the metal powder particles 15a are not sintered together and the glass medium 15b exists to join the spaces between the metal powder particles 15a, the glass in the sintered metal film, as shown in the photograph of FIG. 16, exists as a glass component extruded from the interior of the sintered metal film to the interface between the sintered metal film and the ceramic body by the sintering of the metal powder particles. Alternatively or additionally, although it cannot be confirmed from FIG. 16, the glass may exist at the surface of the sintered metal film as the result of extrusion from the interior to the surface of the sintered metal film due to the sintering of the metal powder particles. In the sintered metal film obtained by firing the electrically conductive paste layer, substantially all of the metal powder particles are sintered and substantially no unsintered metal powder particles exist.

The metal powder particles 15a preferably have an elongated shape as viewed in cross section along the thickness direction of the glass coating layer 15. The metal powder particles 15a are preferably in flake form, such as scaly, flat or acicular form, as viewed in cross section along the thickness direction of the glass coating layer 15. The elongated shape herein indicates that the aspect ratio is about 3 or more.

Figure 9:
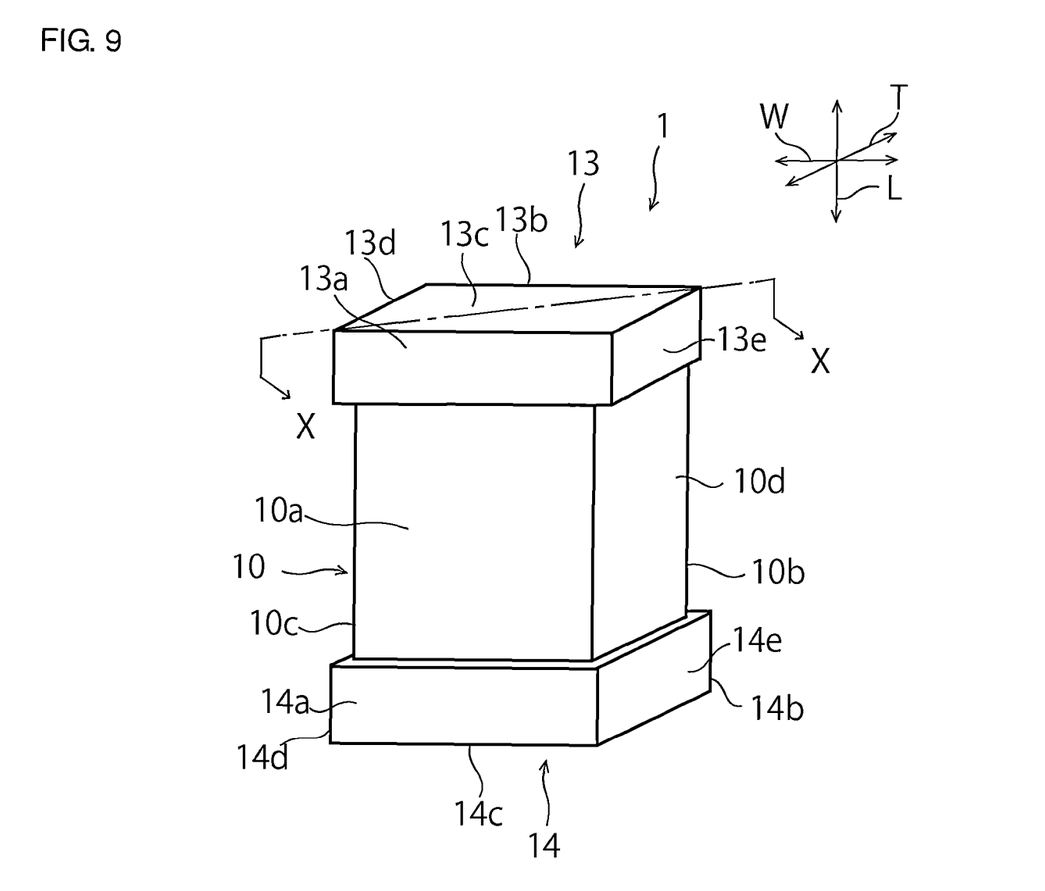
FIG. 9 is a schematic perspective view for illustrating a method for determining the aspect ratio of metal powder particles according to a preferred embodiment of the present invention.
Figure 10:
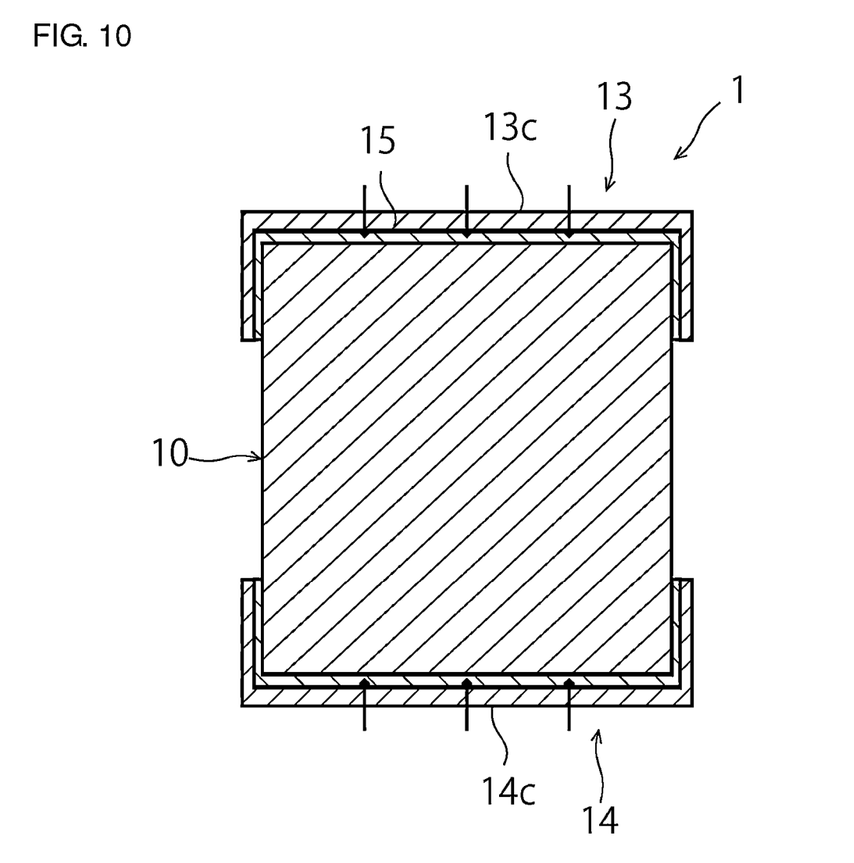
FIG. 10 is a schematic cross-sectional view taken along the line X-X in FIG. 9.

The aspect ratio of the metal powder particles 15a is preferably about 3.6 or more, for example. First, the ceramic electronic component 1 is ground from one of the ridges toward the line X-X connecting a pair of opposing corners of a third portion 13c of the first electrode terminal 13 shown in FIG. 9 to expose a cross section of the glass coating layer 15 as shown in FIG. 10. Next, the resultant cross section is divided into four equal portions in the direction of the line X-X as shown in FIG. 10 and the glass coating layer 15 is observed at the three boundary sites between the adjacent portions using a SEM at a magnification of ×5000 and an accelerating voltage of 15 kV. Next, in the SEM observation at each of the three sites, all of the metal powder particles 15a within a field of 30 µm by 30 µm are measured in terms of diameter on the exposed cross section and the maximum of the measured values is selected as the long diameter. Next, in the metal powder particle 15a having the selected long diameter, the maximum of thicknesses along the axis perpendicular to the axis of the long diameter is selected as the short diameter. By dividing the long diameter by the short diameter, the aspect ratio of this metal powder particle 15a is calculated. Likewise, as shown by the arrows in FIG. 10, the aspect ratios of metal powder particles 15a are calculated also in the glass coating layer 15 of a third portion 14c of the second electrode terminal 14. In this manner, a total of six aspect ratios of metal powder particles 15a are calculated in both the glass coating layers 15 of the first and second electrode terminals 13 and 14. The average value of these six aspect ratios is used as the aspect ratio of the metal powder particles 15a in various preferred embodiments of the present invention. Note that if in the SEM observations a plurality of metal powder particles 15a are contiguous with one another in the direction of their long diameters and thus can be observed as a single integral metal powder particle 15a, the long diameter of the entire integral unit of the plurality of metal powder particles 15a is regarded as the long diameter of a single metal powder particle 15a.

The metal powder particles 15a preferably have an average particle size of about 0.5 µm to about 10 µm, for example. The average particle size of the metal powder particles 15a in preferred embodiments of the present invention refers to an average value of the long and short diameters of the six metal powder particles measured in the above manner, that is, a value obtaining by adding up all the measured long and short diameters of the six metal powder particles and dividing the total by 12.

The metal powder particles 15a define conduction paths electrically connecting the first and second internal electrodes 11 and 12 with the first and second electrode terminals 13 and 14, respectively. At least one of the conduction paths is arranged so that a plurality of the metal powder particles 15a are contiguous with one another across the thickness of the glass coating layer 15.

The conduction path may be non-linear as viewed in cross section along the thickness direction of the glass coating layer 15. The conduction path may include a plurality of relatively narrow portions and a plurality of relatively thick portions.

The long diameter of the metal powder particles 15a defining the conduction paths is preferably equal to or larger than the thickness of the glass coating layer 15. The long diameter of the metal powder particles 15a defining the conduction paths is more preferably about 1.5 or more times the thickness of the glass coating layer 15, for example.

The glass coating layer 15 preferably has a thickness of about 1 µm to about 10 µm, for example. If the thickness of the glass coating layer 15 is less than about 1 µm, this may reduce the effect of improving the moisture resistance of the ceramic electronic component 1 owing to the existence of the glass coating layer 15. If the thickness of the glass coating layer 15 is more than about 10 µm, the absolute amount of glass contained in the glass coating layer 15 becomes large. Thus, the components defining the first and second internal electrodes 11 and 12 are likely to diffuse in liquid phase in molten glass of the glass coating layer 15. In this case, the distal ends of the first and second internal electrodes 11 and 12 will be thin, so that gaps may be created between the first and second internal electrodes 11 and 12 and the adjacent ceramic layers 10g to decrease the moisture resistance of the ceramic electronic component 1.

The thickness of the glass coating layer 15 can be measured by grinding the side surface of the ceramic electronic component 1 to a midportion of the ceramic electronic component 1 along the length direction L to form a cross section and observing the thickness of the glass coating layer 15 located in the middle of the end surface of one of the electrode terminals in the formed cross section using an optical microscope.

The first electrode terminal 13 is provided directly on the associated glass coating layer 15. The first electrode terminal 13 is electrically connected to the first internal electrodes 11 via the conduction paths located in the glass coating layer 15.

The first electrode terminal 13 preferably includes a first portion 13a located on the first principal surface 10a; a second portion 13b located on the second principal surface 10b; a third portion 13c located on the first end surface 10e; a fourth portion 13d located on the first side surface 10c; and a fifth portion 13e located on the second side surface 10d.

The second electrode terminal 14 is provided directly on the associated glass coating layer 15. The second electrode terminal 14 is electrically connected to the second internal electrodes 12 via the conduction paths located in the glass coating layer 15. The second electrode terminal 14 preferably includes a first portion 14a located on the first principal surface 10a; a second portion 14b located on the second principal surface 10b; a third portion 14c located on the second end surface 10f; a fourth portion 14d located on the first side surface 10c; and a fifth portion 14e located on the second side surface 10d.

The first and second electrode terminals 13 and 14 each preferably include a plating film. The plating film is preferably made of at least one metal selected from the group consisting of Cu, Ni, Sn, Pd, Au, Ag, Pt, Bi, and Zn or an alloy containing at least one of these metals. Each of the first and second electrode terminals 13 and 14 may be formed of a monolayer, bilayer or multilayer plating film. For example, the plating film may have a Ni—Sn bilayer structure or a Cu—Ni—Sn trilayer structure. In this preferred embodiment, as shown in FIG. 6, each of the first and second electrode terminals 13 and 14 preferably includes a first layer 13p made of Cu, a second layer 13q made of Ni, and a third layer 13r made of Sn.

The total thickness of the glass coating layer 15 and the first electrode terminal 13 is preferably about 15 μm to about 25 μm, for example. Likewise, the total thickness of the glass coating layer 15 and the second electrode terminal 14 is preferably about 15 μm to about 25 μm, for example.

A description is next given of a non-limiting example of a method for producing the ceramic electronic component 1 of this preferred embodiment.

Figure 11:
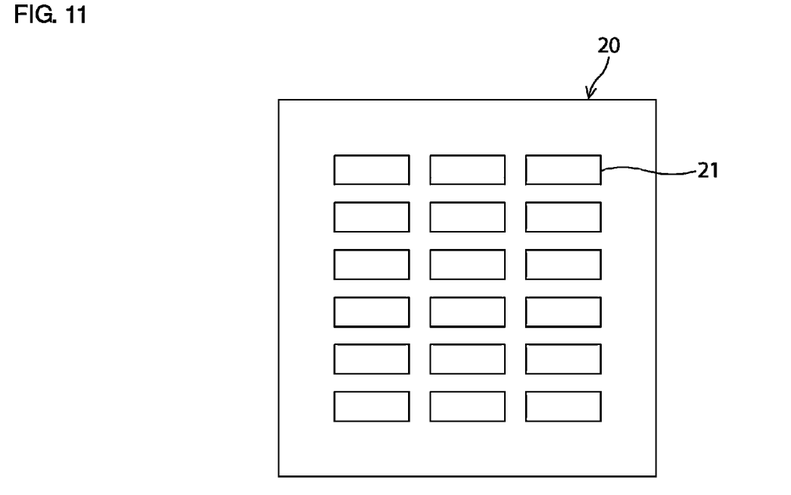
FIG. 11 is a schematic plan view of a ceramic green sheet having an electrical conduction pattern located thereon.

First, a ceramic green sheet 20 (see FIG. 11) is prepared which contains a ceramic material for forming a ceramic body 10. Next, as shown in FIG. 11, an electrically conductive paste is applied on the ceramic green sheet 20 to form an electrically conductive pattern 21. The application of the electrically conductive paste can be performed by various printing processes, such as screen printing. The electrically conductive paste may contain, aside from electrically conductive particles, a known binder and a known solvent.

Next, a plurality of ceramic green sheets 20 with no electrically conductive pattern 21 formed thereon, a ceramic green sheet 20 with an electrically conductive pattern 21 formed in a configuration corresponding to the first or second internal electrodes 11, 12, and a plurality of ceramic green sheets 20 with no electrically conductive pattern 21 formed thereon are laminated in this order on the first-mentioned ceramic green sheet 20 and then isostatically pressed in the laminating direction to produce a mother laminate.

Next, the mother laminate is cut along imaginary cutting lines to produce a plurality of green ceramic laminates from the mother laminate.

The cutting of the mother laminate can be performed by dicing or press cutting. The ridges and corners of the green ceramic laminates may be rounded such as by barrel polishing.

Next, each of the green ceramic laminates is fired. In this firing step, the first and second internal electrodes 11 and 12 are fired. The firing temperature can be appropriately selected depending upon the types of the ceramic material and electrically conductive paste used. The firing temperature may be 900° C. to 1300° C., for example.

Next, a glass paste is applied on relevant regions of each of the fired ceramic laminates, such as by dipping. Next, the glass paste is thermally treated to melt the glass powder into integral molten material and the molten material is cooled to form each glass medium 15b and bond the glass medium 15b and the metal powder particles 15a together, resulting in the formation of each glass coating layer 15. The glass paste used for the formation of the glass coating layer 15 contains glass powder particles, metal powder particles 15a, a binder, a solvent, and so on. Here, the glass powder particles used are preferably those having a smaller particle size than the metal powder particles 15a. Preferably, the thermal treatment temperature is equal to or higher than the softening temperature of the glass powder particles and is such a temperature that does not cause the metal powder particles to sinter. For example, the thermal treatment temperature is preferably 600° C. to 750° C. If the thermal treatment temperature is 600° C. to 750° C., it is possible to prevent the length of the projections 11b and 12b of the first and second internal electrodes 11 and 12 in the glass coating layer 15 from exceeding about 2 μm. If the thermal treatment temperature is lower than 600° C., the glass will not soften, so that the adhesion to the ceramic body 10 may be decreased. If the thermal treatment temperature is higher than 750° C., the length of the projections 11b and 12b of the first and second internal electrodes 11 and 12 in the glass coating layer 15 will be likely to exceed about 35% of the thickness of the glass coating layer 15. In addition, the reaction between the ceramic body 10 and the glass coating layers 15 may be initiated to cause the glass coating layers 15 to disappear.

From the viewpoint of preventing that the length of the projections 11b and 12b of the first and second internal electrodes 11 and 12 in the glass coating layer 15 exceeds about 2 μm, the time for the thermal treatment (i.e., maximum temperature holding time) is preferably about 5 minutes to about 30 minutes.

Next, the glass coating layers 15 are plated to form the first and second electrode terminals 13 and 14. In the above manner, a ceramic electronic component 1 can be produced.

Experimental Example 1

A non-limiting example of a sample ceramic electronic component 1 actually produced in this preferred embodiment is shown below.

Dimensions of ceramic body after firing (design values): 1.0 mm by 0.5 mm by 0.15 mm
    Ceramic material: BaTiO3
    Thickness of ceramic layer after firing (design values): 5 μm
    Material of internal electrode: Ni
    Thickness of internal electrode after firing (design values): 0.6 μm
    Total number of internal electrodes: 45
    Firing condition: keeping at 1200° C. for 2 hours
    Capacity of ceramic electronic component: 0.47 μF
    Thickness of glass coating layer: 5 μm
    Rated voltage of ceramic electronic component: 4 V
    Metal powder particles contained in glass coating layer 15: Cu powder particles
    Average particle size of Cu powder particles: 3 μm
    Major component of glass powder particles in glass paste: borosilicate glass
    Softening point of glass in glass paste: 600° C.
    Average particle size of glass powder particles: 1 μm Ratio of Cu powder particles to glass powder particles in solid content of glass paste: 50% to 50% by volume Condition of thermal treatment: 680° C.

Plating film: Cu film (6 μm thickness), Ni film (3 μm thickness), and Sn film (3 μm thickness) are formed in this order on glass coating layer 15.

Five types of samples of the ceramic electronic component 1 were produced, 20 for each type, by thermally treating the glass paste at 680° C. for 5 minutes, 15 minutes, 30 minutes, 60 minutes or 120 minutes. The samples were subjected to a humidity stress test in the following manner. Each sample was mounted on a glass epoxy substrate using eutectic solder. Thereafter, the samples were subjected to an accelerated humidity stress test at a voltage of 2 V for 72 hours in a high-temperature (125° C.) and high-humidity (95% RH) chamber. Among them, samples having an insulation resistance value (IR value) reduced by two or more digits were regarded as those deteriorated in moisture resistance.

Furthermore, the LT surface of the sample was ground to a midportion of the W dimension to form a cross section. The interface between the ceramic body and the glass coating layer located in the middle of one end surface in the formed cross section was observed by SEM (5000-fold magnification, 15 kV accelerating voltage, and 30 μm by 30 μm field) to measure the lengths of projections of ten internal electrodes projecting from the ceramic body surface. An average value of the measured lengths was calculated. Out of 20 samples of each type, five were each determined in terms of average value of lengths of projections in this manner and an average of the average values determined from the five samples was calculated. The results of the humidity stress test are shown in TABLE 1.

TABLE 1

|  | Thermal Treatment Holding Time | | | | |
| --- | --- | --- | --- | --- | --- |
|  | 5 min. | 15 min. | 30 min. | 60 min. | 120 min. |
| Length of Projection | 0.4 μm | 1.2 μm | 1.7 μm | 3.3 μm | 4.7 μm |
| Length of Projection/ Thickness of Glass Coating Layer | 8% | 24% | 34% | 66% | 94% |
| Number of Samples Deteriorated in Moisture Resistance | 0/20 | 0/20 | 0/20 | 3/20 | 8/20 |

Experimental Example 2

Samples were produced in the same manner as in Experimental Example 1 except that the glass coating layer 15 had a thickness of 10 μm, and the samples were subjected to a humidity stress test in the same manner as in Experimental Example 1. The results are shown in TABLE 2 below.

TABLE 2

|  | Thermal Treatment Holding Time | | | |
| --- | --- | --- | --- | --- |
|  | 10 min. | 30 min. | 60 min. | 120 min. |
| Length of Projection | 1.2 μm | 2.5 μm | 3.4 μm | 6.7 μm |
| Length of Projection/Thickness of Glass Coating Layer | 12% | 25% | 34% | 67% |
| Number of Samples Deteriorated in Moisture Resistance | 0/20 | 0/20 | 0/20 | 2/20 |

As described previously, in this preferred embodiment, the glass coating layers 15 preferably cover portions of the surface of the ceramic body 10 on which the first and second internal electrodes 11 and 12 are exposed. The internal electrodes 11 and 12 project from the surface of the ceramic body 10 into the glass coating layer 15 without passing through the glass coating layer 15. Therefore, moisture is less likely to enter the interior of the ceramic body 10 from the exposed portions of the first and second internal electrodes 11 and 12. Hence, the ceramic electronic component 1 of this preferred embodiment has superior moisture resistance. The results shown in TABLES 1 and 2 reveal that, from the viewpoint of achieving more superior moisture resistance, the ratio of the length of the projections 11b and 12b to the thickness of the glass coating layer 15 ((Length of Projection 11b, 12b)/(Thickness of Glass Coating Layer 15)) is preferably about 50% or less, more preferably about 40% or less, still more preferably about 35% or less, and yet more preferably about 34% or less, for example.

Hereinafter, other preferred embodiments of the present invention will be described. In the following description of preferred embodiments, elements having functions substantially common to those of elements in the first preferred embodiment are referred to by common reference numerals, and further explanation thereof will be accordingly omitted.

Second Preferred Embodiment

Figure 12:
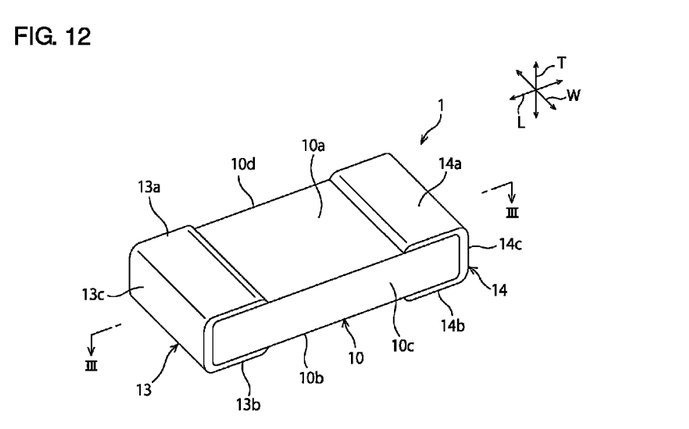
FIG. 12 is a schematic perspective view of a ceramic electronic component according to a second preferred embodiment of the present invention.

FIG. 12 is a schematic perspective view of a ceramic electronic component according to a second preferred embodiment of the present invention.

In the above first preferred embodiment, an example has been described in which the first and second electrode terminals 13 and 14 and the glass coating layers 15 are preferably located on the first and second side surfaces 10c and 10d. However, as shown in FIG. 12, the first and second electrode terminals 13 and 14 and the glass coating layers 15 may not be substantially located on the first and second side surfaces 10c and 10d.

Figure 13:
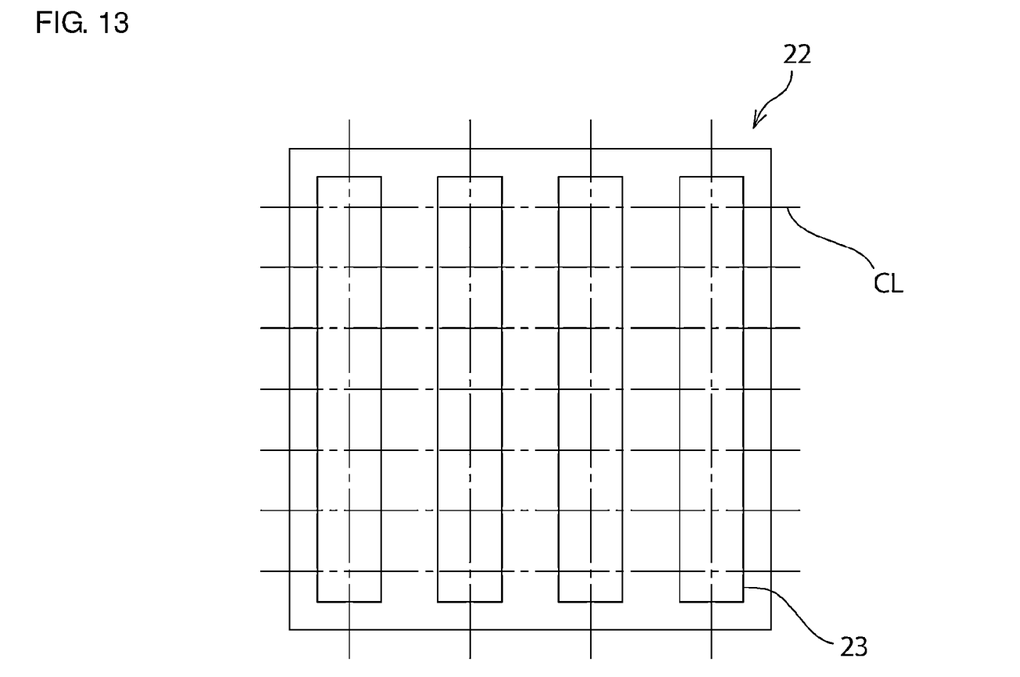
FIG. 13 is a schematic plan view for illustrating a method for producing the ceramic electronic component according to the second preferred embodiment of the present invention.

The ceramic electronic component according to the second preferred embodiment can be produced, for example, in the following manner. A mother laminate 22 (see FIG. 13) is obtained in the same manner as in the method for producing the ceramic electronic component 1 according to the first preferred embodiment. In this preferred embodiment, next, as shown in FIG. 13, an electrically conductive pattern 23 having a configuration corresponding to the first and second portions 13a, 13b, 14a, and 14b of the first and second electrode terminals 13 and 14 is formed on the mother laminate 22 by an appropriate printing process, such as screen printing. Next, the mother laminate 22 is cut along imaginary cutting lines CL to produce a plurality of green ceramic laminates from the mother laminate 22.

Next, each of the green ceramic laminates is fired. Next, a glass paste is applied on both end surfaces of the fired ceramic laminate. Next, the glass paste is thermally treated to form glass coating layers 15 having shapes corresponding to the third portions 13c and 14c of the first and second electrode terminals 13 and 14. Next, the glass coating layers 15 are plated to form the first and second electrode terminals 13 and 14. Thus, the ceramic electronic component according to the second preferred embodiment can be produced.

The glass paste applied to the third portions 13c and 14c of the first and second electrode terminals 13 and 14 is preferably different in type of metal or type of inorganic filler from the electrically conductive pattern 23 formed on the first and second portions 13a, 13b, 14a, and 14b of the first and second electrode terminals 13 and 14. For example, the electrically conductive pattern 23 preferably contains Ni and a common ceramic material to the ceramic material contained in the ceramic body 10.

Third Preferred Embodiment

Figure 14:
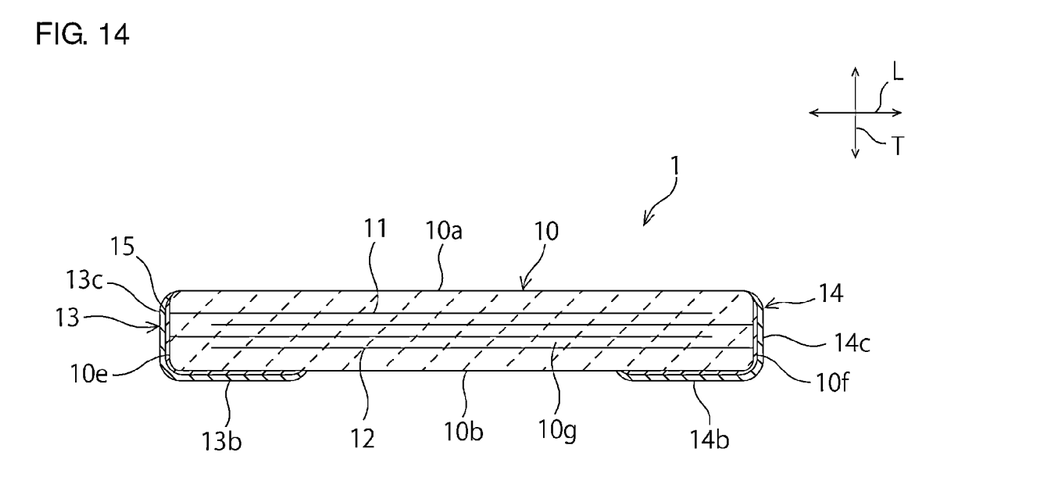
FIG. 14 is a schematic cross-sectional view of a ceramic electronic component according to a third preferred embodiment of the present invention.

FIG. 14 is a schematic cross-sectional view of a ceramic electronic component according to a third preferred embodiment of the present invention.

In the above first preferred embodiment, an example has been described in which the first and second electrode terminals 13 and 14 and the glass coating layers 15 are preferably located on both the first and second principal surfaces 10a and 10b. However, the present invention is not limited to this configuration. The first and second electrode terminals 13 and 14 and the glass coating layers 15 only have to be located somewhere on the surface of the ceramic body 10.

For example, as shown in FIG. 14, the first and second electrode terminals 13 and 14 and the glass coating layers 15 may be located on the second principal surface 10b but not located on the first principal surface 10a.

Fourth Preferred Embodiment

Figure 15:
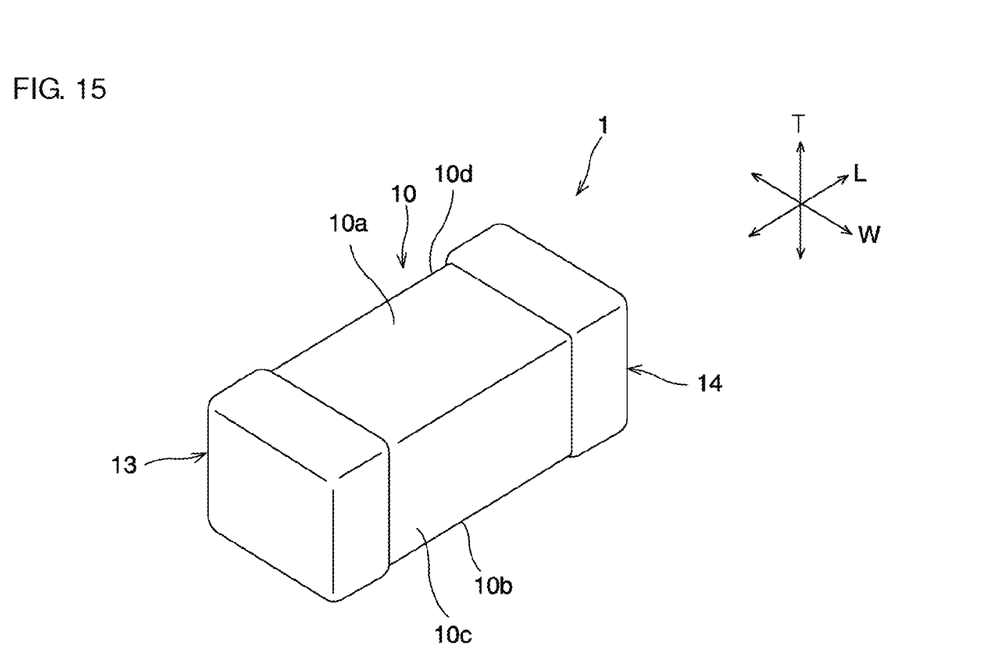
FIG. 15 is a schematic perspective view of a ceramic electronic component according to a fourth preferred embodiment of the present invention.

FIG. 15 is a schematic perspective view of a ceramic electronic component according to a fourth preferred embodiment of the present invention.

In the above first preferred embodiment, an example has been described in which the inequality $D_T<D_W<D_L$ preferably holds where the thickness of the ceramic body 10 is represented by $D_T$, the length thereof is represented by $D_L$, and the width thereof is represented by $D_W$. However, as shown in FIG. 15, the ceramic body 30 may preferably satisfy $D_W \leq D_T < D_L$, for example.

As described so far, in various preferred embodiments of the present invention, a ceramic electronic component having superior moisture resistance can be provided. With the above structure, preferred embodiments of the present invention can be widely applied to various laminated ceramic electronic components.

For example, if the ceramic electronic component is a piezo-ceramic element, the ceramic body can be made of a piezo-ceramic material. Specific non-limiting examples of the piezo-ceramic material include lead zirconate titanate (PZT) based ceramic materials.

Alternatively, if the ceramic electronic component is a thermistor, the ceramic body can be made of a semiconductor ceramic material. Specific non-limiting examples of the semiconductor ceramic material include spinel ceramic materials.

Still alternatively, if the ceramic electronic component is an inductor, the ceramic body can be made of a magnetic ceramic material. Specific non-limiting examples of the magnetic ceramic material include ferrite ceramic materials.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic electronic component comprising:
a ceramic body;
a plurality of internal electrodes provided in the ceramic body and including ends exposed on a surface of the ceramic body;
at least one glass coating layer covering a portion of the surface of the ceramic body on which the plurality of internal electrodes are exposed; and
at least one electrode terminal provided directly on the at least one glass coating layer and including a plating film; wherein
the at least one glass coating layer is made of a glass medium in which metal powder particles are dispersed;
the plurality of internal electrodes project from the surface of the ceramic body into the at least one glass coating layer without passing through the at least one glass coating layer; the at least one glass coating layer is a composite film in which the glass medium and the metal powder particles are integrally bonded;
the at least one glass coating layer has a thickness of about 1 to 10 μm;
the metal powder particles define conduction paths electrically connecting the plurality of internal electrodes with the at least one electrode terminal; and
all of the metal powder particles are not sintered together and the glass medium continuously exists to join the spaces between the metal powder particles.

2. The ceramic electronic component according to claim 1, wherein portions of the internal electrodes projecting from the surface of the ceramic body have a length of about 50% or less of a thickness of the at least one glass coating layer.

3. The ceramic electronic component according to claim 2, wherein the portions of the internal electrodes projecting from the surface of the ceramic body have a length of about 34% or less of the thickness of the at least one glass coating layer.

4. The ceramic electronic component according to claim 1, wherein at least one of the conduction paths is arranged so that a plurality of the metal powder particles are contiguous with one another across a thickness of the at least one glass coating layer.

5. The ceramic electronic component according to claim 1, wherein the metal powder particles contain a major component different from a metal contained as a major component in the internal electrodes.

6. The ceramic electronic component according to claim 1, wherein the metal powder particles include a core made of Cu.

7. The ceramic electronic component according to claim 1, wherein at least one of the conduction paths is non-linear as viewed in cross section along a direction of the thickness of the at least one glass coating layer.

8. The ceramic electronic component according to claim 1, wherein at least one of the conduction paths includes a plurality of relatively narrow portions and a plurality of relatively thick portions.

9. The ceramic electronic component according to claim 1, wherein a portion of the plating film in contact with the at least one glass coating layer includes a Cu plating film or a Ni plating film.

10. The ceramic electronic component according to claim 1, wherein an amount of glass in the at least one glass coating layer is about 35% by volume or more.

11. The ceramic electronic component according to claim 1, wherein an amount by which the plurality of internal electrodes project from the surface of the ceramic body into the at least one glass coating layer without passing through the at least one glass coating layer is about 1.7 μm or less.

12. The ceramic electronic component according to claim 1, wherein the at least one electrode terminal includes two electrode terminals located on first and second side surfaces of the ceramic body, respectively.

13. The ceramic electronic component according to claim 1, wherein the at least one electrode terminal includes two electrode terminals that are not located on first and second side surfaces of the ceramic body.

14. The ceramic electronic component according to claim 1, wherein the ceramic body includes first and second principal surfaces and the at least one electrode terminal includes two electrode terminals located on the second principal surface but not on the first principal surface of the ceramic body.

15. The ceramic electronic component according to claim 1, wherein ceramic body has a thickness $D_T$, a length $D_L$, and a width $D_W$, which satisfy $D_T < D_W < D_L$, $(1/5)D_W \leq D_T \leq (1/2)D_W$ or $D_T < 0.3$ mm.

16. The ceramic electronic component according to claim 15, wherein the ceramic body satisfies $0.05$ mm $\leq D_T < 0.3$ mm, $0.4$ mm $\leq D_L \leq 1$ mm, and $0.3$ mm $\leq D_W \leq 0.5$ mm.

17. The ceramic electronic component according to claim 1, wherein ceramic body has a thickness $D_T$, a length $D_L$, and a width $D_W$, which satisfy $D_W < D_T < D_L$.

18. The ceramic electronic component according to claim 1, wherein the at least one coating layer includes a plurality of coating layers arranged to cover portions of the ceramic body at which the internal electrodes are exposed.

19. The ceramic electronic component according to claim 18, wherein the plurality of coating layers are provided on first and second end surfaces of the ceramic body, both ends of each of first and second principal surfaces in a length direction of the ceramic body, and both ends of each of first and second side surfaces of the ceramic body in the length direction.

* * * * *